United States Patent

Wittkopp et al.

[11] 4,119,001
[45] Oct. 10, 1978

[54] METHOD OF AND MACHINE FOR REPROFILING A RAILROAD-CAR WHEEL

[75] Inventors: Helmut Wittkopp; Achim Lison, both of Erkelenz, Fed. Rep. of Germany

[73] Assignee: Wilhelm Hegenscheidt GmbH, Erkelenz, Fed. Rep. of Germany

[21] Appl. No.: 793,276

[22] Filed: May 3, 1977

[30] Foreign Application Priority Data

May 8, 1976 [DE] Fed. Rep. of Germany ....... 2620393

[51] Int. Cl.² .................. B23B 1/00; B23B 5/28; B23B 3/28
[52] U.S. Cl. ............................ 82/1 C; 82/8; 82/14 R
[58] Field of Search ............................ 82/8, 1 C, 14

[56] References Cited

U.S. PATENT DOCUMENTS

| 258,907 | 6/1882 | Flower | 82/8 |
|---|---|---|---|
| 1,920,209 | 8/1933 | Norton | 82/1 C |
| 1,949,512 | 6/1934 | Norton | 82/1 C |
| 2,792,736 | 5/1957 | Oster et al. | 82/8 |
| 3,207,011 | 9/1965 | Erfert | 82/8 |
| 3,518,914 | 7/1970 | Dombroski et al. | 82/8 |

FOREIGN PATENT DOCUMENTS

| 57,378 | 1/1913 | Austria | 82/8 |
|---|---|---|---|
| 527,156 | 6/1931 | Fed. Rep. of Germany | 82/8 |
| 14,335 | 10/1956 | Fed. Rep. of Germany | 82/8 |
| 759,913 | 10/1956 | United Kingdom | 82/8 |

*Primary Examiner*—Harrison L. Hinson
*Attorney, Agent, or Firm*—Michael J. Striker

[57] ABSTRACT

A railroad-car wheel is rotated continuously about its central axis. A tool having three axially and radially spaced cutting portions is first displaced along the wheel so as to remove high spots at the inner and outer edges thereof by means of the two end cutting portions. Thereafter the tool is backed up and again axially displaced over the rotating wheel so that the cutting portions sequentially take more material off the workpiece constituted by the wheel and impart to it the desired profile in a single second pass.

11 Claims, 6 Drawing Figures

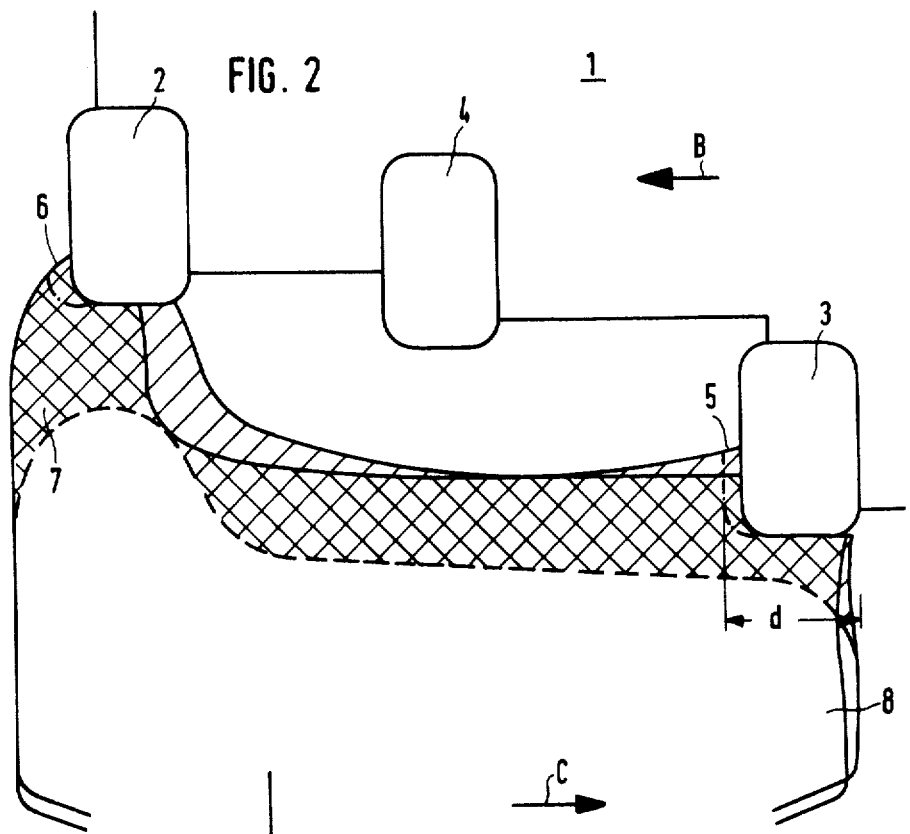
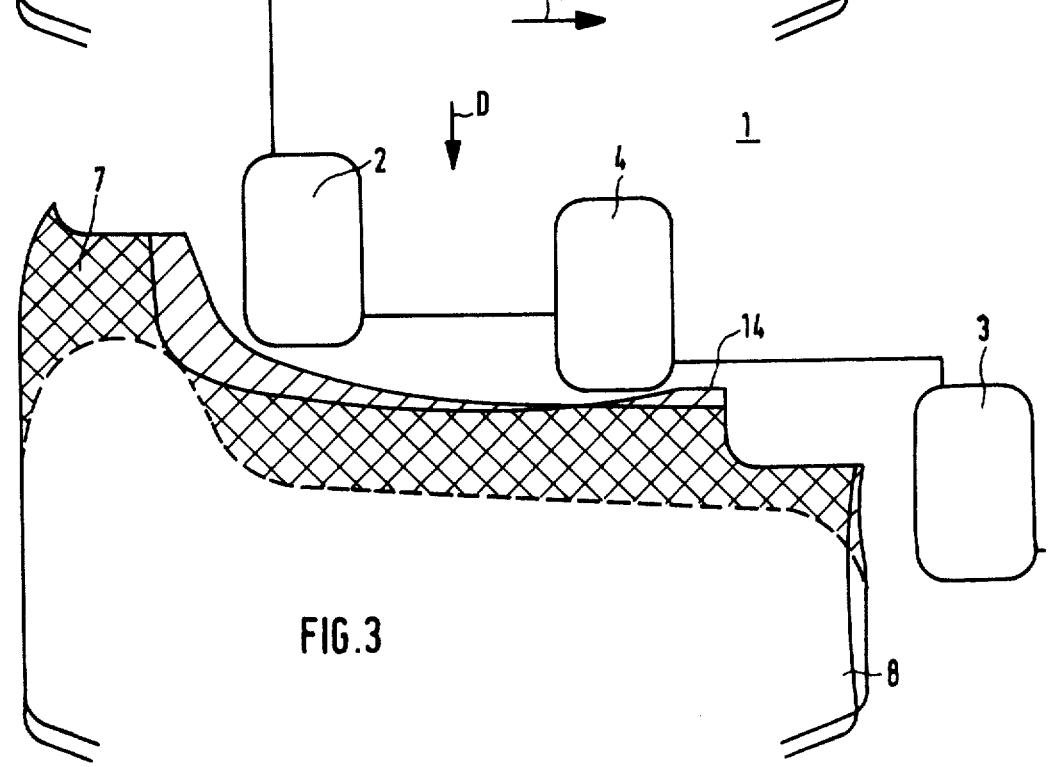

METHOD OF AND MACHINE FOR REPROFILING A RAILROAD-CAR WHEEL

BACKGROUND OF THE INVENTION

The present invention relates to a method of and machine for reprofiling the periphery of a railroad-car wheel. More particularly this invention concerns the turning-down of the worn periphery of such a wheel.

A railroad-car wheel is formed as a body of revolution having an outer periphery formed at an inside axial edge with a flange and having a running surface terminating at the outside axial edge of this outer periphery. After considerable use the outer periphery wears away at the running surface between the flange and the outer edge, so that the flange projects considerably radially beyond the running surface which itself has a bulge at its outside edge.

As such railroad-car wheels are made of steel and quite expensive, it is standard practice to turn down the worn wheels so as to reprofile them, giving them a new running surface. Such reprofiling slightly reduces the diameter of the wheel, but this has been found to have practically no effect on a standard railroad-car wheel which is only mounted on a bogey and which is not driven.

In a typical machining operation the wheel is mounted in a lathe-type holder which rotates this wheel about its normal rotation axis. A tool is guided by a template having the shape to be imparted to the wheel over the surface thereof in a succession of passes, with the tool being stepped radially toward the rotation axis of the wheel between each pass. Since the wheel is typically worn most deeply between its outside edge and its flange, during the first several passes material is only removed from these regions. Only when these regions have been cut down sufficiently, can the entire outer periphery be machined in a single last pass so as to impart to it the desired profile.

Thus such an operation is relatively complex. It is impossible to turn the wheel down in a single pass, as the periphery of the wheel is of hard steel and the cutting tool can only make a cut of a maximum depth which is normally only a fraction of the maximum amount that the wheel periphery must be reduced in order to reprofile the entire outer surface thereof. For this reason the machining task is a lengthy operation, as the first several passes at least of the tool only serve to remove the high spots on the wheel periphery.

SUMMARY OF THE INVENTION

It is therefore an object of the present invention to provide an improved method of and machine for reprofiling a railroad-car wheel or like workpiece.

Another object is to provide a method of turning down a railroad-car wheel which overcomes the above-given disadvantages.

These objects are attained according to the present invention in a method comprising the steps of simultaneously premachining the wheel periphery at two spaced-apart locations in a first pass with a tool having two spaced-apart cutting portions to remove high spots from the periphery. Thereafter the entire periphery is machined with a single cutting portion of the tool in a single second pass. According to this invention the wheel is continuously rotated about its central axis and the two cutting portions of the tool are jointly displaced along the axis. These cutting portions are axially and radially spaced from each other so that they remove in a single pass the high spot at the outer edge of the running surface and the high spot on the flange of the wheel.

Thus it is possible according to the present invention in a single pass to prepare even a very badly worn railroad wheel for reprofiling in a single second pass. Since two cutting portions of the tool simultaneously act on separate locations of the railroad-car wheel, treatment time is reduced to a minimum and overall efficiency is greatly increased. Indeed such an arrangement allows a railroad-car wheel to be turned down by a machinist in a fraction of the time hitherto needed.

According to yet another feature of this invention the tool is provided with a third such cutting portion which is axially and radially intermediate the two first-mentioned portions. During the second pass this third portion is effective to take off material from the flange as the trailing cutting portion finish-machines the entire outer periphery of the workpiece.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWINGS

FIGS. 1-6 are large-scale sequential views showing the method and machine according to the present invention.

DESCRIPTION OF A PREFERRED EMBODIMENT

Figure 1:
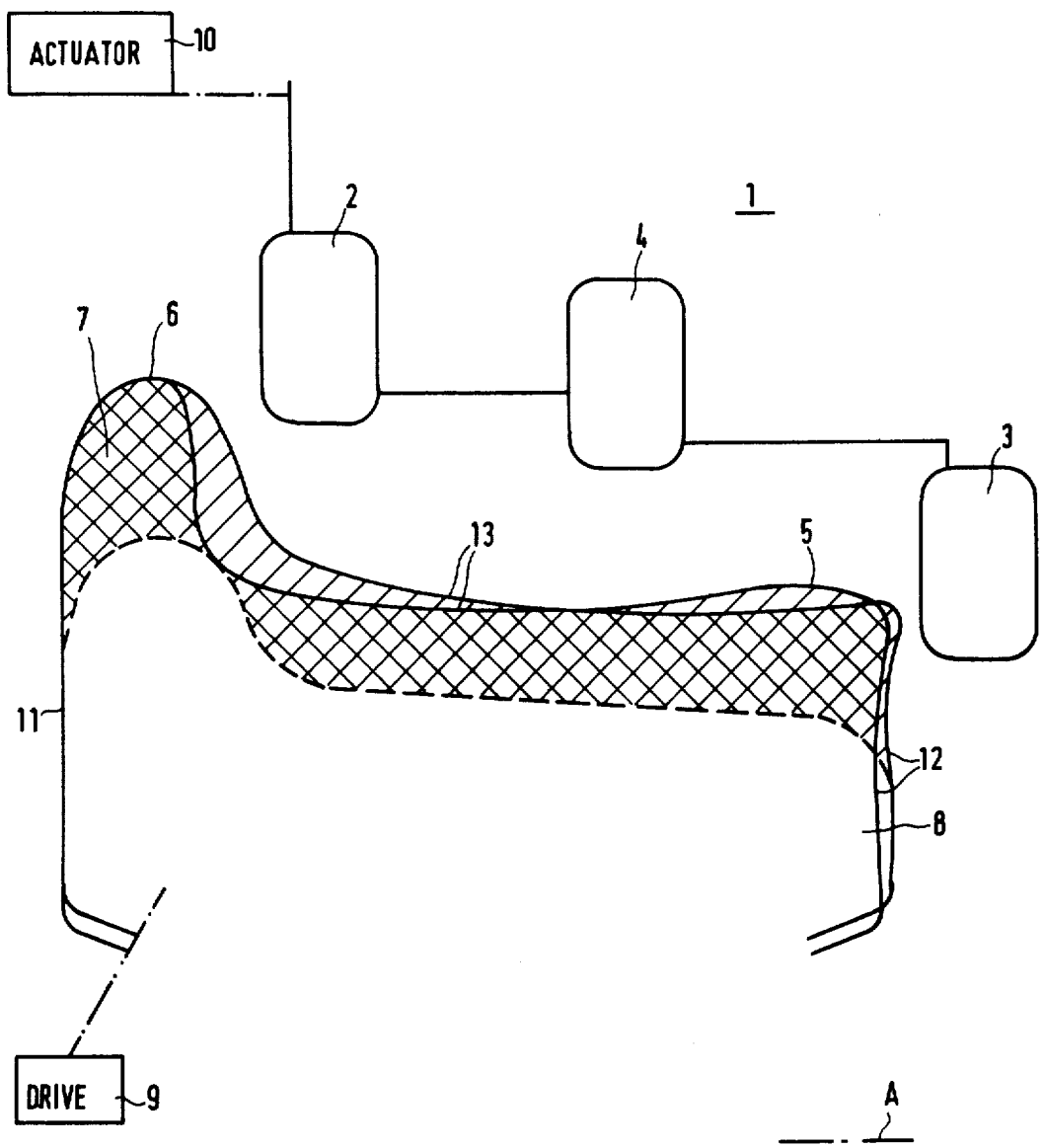

As shown in FIG. 1 a tool 1 is displaceable by means of an actuator 10 adjacent a railroad-car wheel 8 rotatable by means of a drive 9 about its central axis A. The tool 1 carries leading and trailing cutting elements or cutting portions 2 and 3 respectively and a middle cutting element or cutting portions 4. These elements 2-4 are radially and axially spaced from each other and are each formed as high-speed tool bits.

The wheel 8 has an inside edge 11 formed with a flange 7 and an outside edge 12. A running surface 13 extends from the flange 7 to the outside edge 12.

As shown in FIG. 1 the running surface 13 is worn and is formed with a high spot or bump 5 adjacent the outside edge 12. Similarly the flange 7 extends upwardly at 6 to an extent beyond the running surface 13 that is greater than the original such spacing.

As best shown in FIG. 2 during a first pass axially across the workpiece in the direction of arrow B the leading cutter 2 removes the portion 6 and the trailing cutter 3 removes the bump 5. The positions the cutters 2 and 3 will assume at the end of the first pass are shown in dot-dash lines in FIG. 2. It is noted that during this first pass the cutter 4 does not make contact with the wheel 8.

Thereafter as shown in FIG. 3 the tool is displaced axially backwardly in the direction of arrow C and then radially downwardly in the direction of arrow D toward the axis A. Before or after this repositioning of the tool 1 the cutter 4 may cut off a portion of the running surface as indicated at 14.

Figure 4:
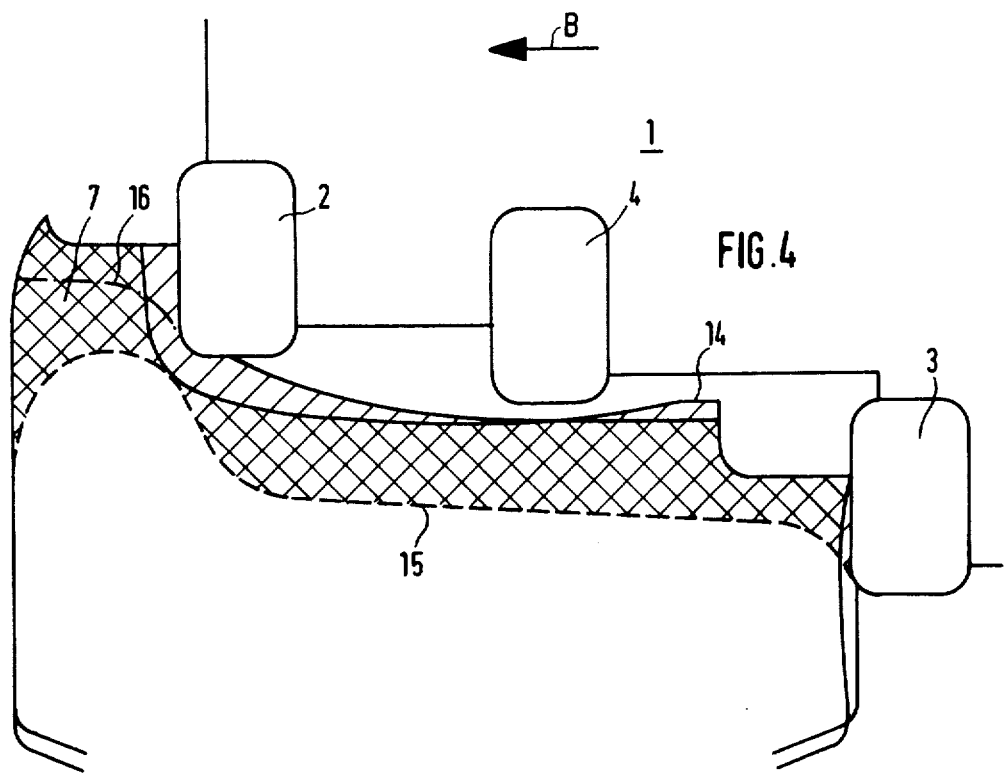

FIG. 4 shows how thereafter the tool 1 is displaced axially in the direction of arrow B so that the cutter 3 follows the path indicated by dash line 15, which here is the desired profile which is to be imparted to the wheel 8. During such displacement the cutter 4 may cut off the portion 14 and the cutter 2 will remove more of the flange 7 as shown by dot-dash lines 16. What is more as indicated in FIGS. 5 and 6 the intermediate cutter 4 will, as the tool 1 continues in its second pass over the wheel 8, remove another portion from the flange 7.

A fourth cutter 17 may be provided behind the cutter 3 to finish off the inside edge region 18 of the flange 7.

Figure 5:
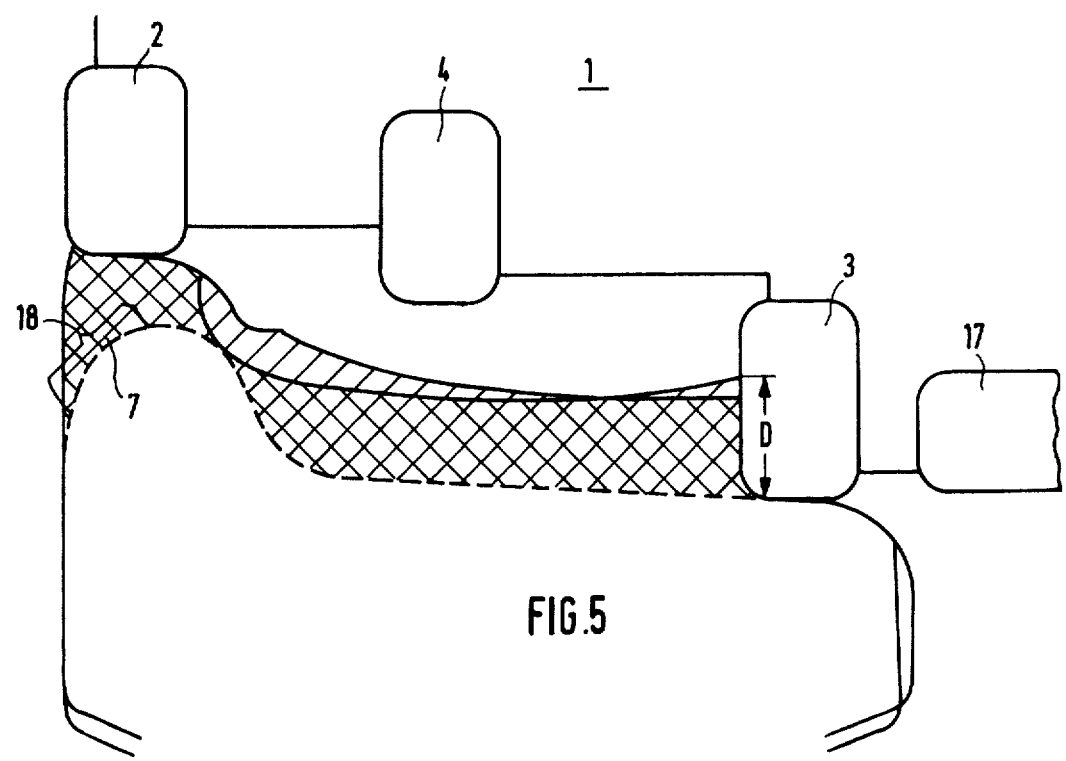
Figure 6:
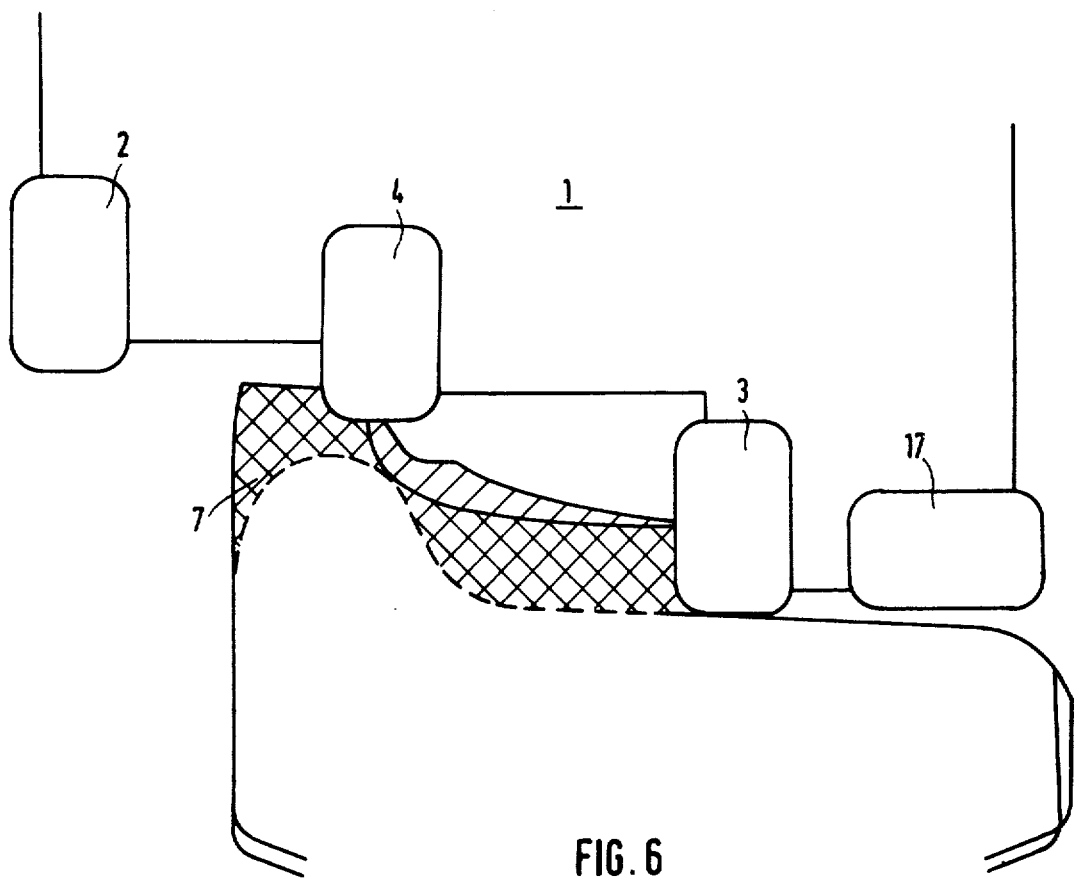

At no time need any of the cutters make a cut deeper than the depth indicated at D in FIG. 5. This is possible even though the flange 7 may be cut down by a depth substantially greater than twice this distance D. Such considerable turning down of the wheel 8 is possible because in the first pass two separate locations are cut away by an axial distance d as shown in FIG. 2. This first pass is therefore relatively short so that it takes very little time. Thereafter in a single third pass all of the cutting portions 2, 3 and 4 are sequentially effective on the wheel 8 so as to impart to it the desired profile 15 in a single second pass. The cutting portions 2-4 are all identically loaded and axially and radially positioned relative to each other so that the stress on one of the cutters will not be substantially greater or smaller than the stress on any of the others. In this manner a long tool life is assured and excellent machining results can be obtained.

It has been found with the system according to the present invention it is possible for the first cut to be executed in a very short time, and thereafter for the second cut or pass to be made relatively quickly also, as none of the cutters must remove more than a relatively limited amount of the workpiece. Indeed it is possible in such a system to use conventional and economical machining bits as the method allows these cutters to be used well within their range of safe and economical operation as regards to loading and depth of cut.

It will be understood that each of the elements described above, or two or more together, may also find a useful application in other types of systems differing from the types described above.

While the invention has been illustrated and described as embodied in a system for turning-down railroad-car wheels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of reprofiling the outer periphery of a railroad car wheel by a turning operation with a single tool having several cutting portions arranged in fixed position relative to each other, said method comprising the steps of simultaneously premachining said periphery at two opposite axial end portions in a first pass with two cutting portions of said tool; and thereafter machining the entire periphery with at least one of said two cutting portions in a single finish cutting pass, the fixed position of said cutting portions relative to each other being maintained during the whole machining operation.

2. The method defined in claim 1, wherein said tool has a third such cutting portion, said method further comprising the step of removing material from said periphery with said third portion during said second pass.

3. A method as defined in claim 1, wherein said wheel has a flange portion constituting one of said end portions and a running surface, part of which forms said other end portion.

4. A method as defined in claim 3, wherein during said first pass said flange portion is cut through the same width as said part of said running surface.

5. A method of reprofiling the outer periphery of a railroad car wheel, comprising the steps of continuously rotating said wheel about its axis; displacing a tool having at least two cutting portions arranged in fixed position axially and radially displaced with respect to each other in a first cutting pass from a first end position in axial direction for premachining said periphery at opposite axial end portions with said two cutting portions; returning said tool in a direction opposite to said first pass to a second end position substantially axially aligned but radially displaced toward said axis from said first end position; and thereafter moving said tool from said second end position in said axial direction in a single second cutting pass over all of said periphery for finish cutting the periphery with at least one of said two cutting portions, the fixed position of said cutting portions relative to each other being maintained during said first cutting pass, during returning of said tool and during said second cutting pass.

6. A method as defined in claim 5, wherein said wheel has a flange portion constituting one of said end portions and a running surface, part of which forms said other end portion.

7. The method defined in claim 6, wherein during said second pass the other cutting portion removes material from said flange.

8. The method defined in claim 5, wherein said tool has a third such cutting portion intermediate the other two portions, said third cutting portion removing material from said periphery during said second pass also.

9. A machine for reprofiling the outer periphery of a railroad car wheel, comprising a single tool having a plurality of spaced apart cutting portions permanently arranged in fixed position relative to each other; means for relatively displacing said wheel and said tool in a first pass for simultaneously premachining of said periphery at two separate spaced apart locations thereon with two of said cutting portions; and means for relatively displacing said wheel and said tool in a last single pass over all said periphery for imparting to the wheel the desired profile by means of at least one of said two cutting portions.

10. The machine defined in claim 9, wherein said tool has a third such cutting portion between said two cutting portions.

11. The machine defined in claim 9, wherein said means relatively displacing said wheel and said tool in said first pass displaces said tool in a straight line, said portions being spaced apart along and transversely of said straight line.

* * * * *